3,258,908
TAPE CARTRIDGE TIMER
Norman A. Fischer, 2610 Avie, Jennings, Mo.
Filed Apr. 27, 1965, Ser. No. 451,113
1 Claim. (Cl. 58—145)

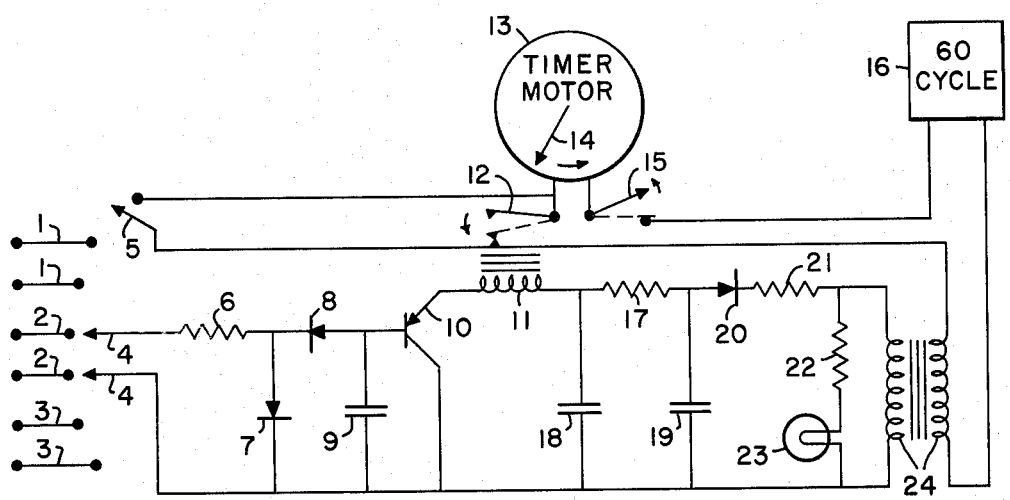

One of the principal difficulties in using a tape cartridge lies in the inability to keep an accurate record of the length of time remaining unused on the cartridge.

When recording, for both professional and amateur use, a stopwatch can be used in the following manner. Each time a recording input is begun, the stopwatch is started. Each time the recording input is stopped, the watch is stopped. In this manner a cumulative total is made of the time elapsed in recording. If the total time recording can be accumulated in this manner, this total can be subtracted from the total available time to record on the cartridge, which depends on the cartridge size and the result will then be the remaining time available to record. It is this last figure which is the important one and which is difficult to obtain continuously.

The principal object of my invention is therefore to construct a device which will automatically and continuously read out the total unconsumed time available for recording on a given tape cartridge.

Another object of my invention is to provide a small, convenient device which will record the time available to record, and which will be started and stopped automatically by the starting and stopping of the recorder.

Obviously, also there will be many occasions in which the recording input will be stopped, the recorder will be reversed to erase a part of what has been recorded, and then the recording will begin again. This continually happens during a given recording session. The recording engineer is continually asked by the recording producer to tell how much time has been used, and how much is available. With my device the last question's answer is continuously available.

Additional objects and advantages of my invention will be obvious to those skilled in the art to which the invention pertains, from a study of the drawing and the accompanying specification.

Referring now to the figure, numerals 1—1 are given to a pair of inputs, which represent the control output leads from any given recorder. Numerals 2—2 similarly are given to a pair of inputs which are usable alternately. Numerals 3—3 similarly are given to an additional pair of inputs which are usable alternately.

Numerals 4—4 are given to a pair of selector switch leads. The selector switch leads 4—4 can be switched to contact either 1—1, 2—2, or 3—3 inputs. The three input sets 1—1, 2—2, and 3—3 are adapted in the customary manner to take inputs of any voltage ranging from five to one hundred and fifty volts, alternating current and direct current. Each is appropriately marked. The purpose of this arrangement is to make the device adaptable to all of the standard outputs from recorders commonly used. These outputs from such recorders are used as the inputs to control and drive my tape cartridge timer.

Numeral 5 is given to a manual starter switch, which must be closed to start operation. Proceeding to the right in the circuitry, I show a clipper circuit section, consisting of the resistor 6, the rectifiers 7 and 8 and the capacitor 9. Amplification is obtained from the transistor 10.

The coil 11 and the switch 12, constitute a clock relay which serves to turn the timer motor on and off in controlled sequence from the inputs received at the selector switch leads 4—4.

The timer motor or clock 13 is arranged slightly different from the customary manner. The clock face is numbered in usual order and the clock hand is arranged to move counterclockwise, as shown at 14. The numeral 15 is given to a timer enclosed switch. Switch 15 is arranged to turn off the unit automatically when the timer returns to zero, after the hand has rotated all the way to the final position. This is accomplished by interrupting the line to the power supply 16, which is the customary 110 volt, 60 cycle clock supply. The resistor 17 and the capacitors 18 and 19 constitute a ripple filter. Numeral 20 is given to the silicon rectifier; while 21 is given to the surge resistor. Resistor 22 is a dropping resistor to protect the pilot light 23, and the transformer is numbered 24.

In operation, the clipper circuit immediately adjacent to the selector switch 4—4 operates to pass a small A.C. voltage, or a D.C. voltage. A large A.C. voltage will pass a portion of the A.C. wave, in the customary manner, as a small square wave. If the polarity is reversed, the silicon rectifier 8 will block it. As a consequence the device will pass a control voltage of any amount from 5 to 150 volts A.C. or D.C., all of which lie in the output range of the standard tape cartridge recorders.

At the begining the clock or timer is wound manually to the position which represents the maximum time which the recording can take, for example: 15 minutes. This action automatically closes the switch numbered 15.

Now starting the recording on the tape cartridge will cause an input voltage to enter the leads of the selector switch 4—4. Of course this selector switch is placed on the proper one of the set of input switches 1—1, 2—2 or 3—3. When the input voltage enters the leads, it either passes fully or is clipped as explained previously. It goes through the transistor 10 and actuates the switch 12, starting the timer motor running.

Now the hand 14 on the timer motor 13 begins moving in a counter clockwise direction, indicating that lesser and lesser amounts of time remain. After running one minute, the timer motor will indicate that only 14 minutes remain, or fifteen minus one.

If the recording is halted, the tape cartridge stops. This means that the output from the recorder stops and there is no input to the leads 4—4. When this happens, the voltage through the transistor 10 and the coil 11 halts. Hence the switch 12 opens and the timer motor stops. When the recording is resumed, the action begins over and the cycle is started as before. The timer motor begins again and the clock hand 14 resumes its counterclockwise movement. This cycling will continue over and over, as the recording is stopped and started.

However the timer motor 13 will always show on its face, by the position of the hand 14, exactly how much time remains of the amount available.

The pilot light remains lit to show that the recording is running, so long as there is time remaining on the cartridge. The switch 15 of the timer motor automatically turns off the unit when the hand 14 reaches zero.

It will be obvious from the preceding that many various changes and modifications may be made in my invention without departing from the essence of the invention. I do not intend to be limited by any other limitations other than those expressed in tthe attached claim.

I claim:

In a tape cartridge timer of the type described, a timer clock having its clock face printed with numerals and adapted to have its time indicating hand move in the counterclockwise sense;

three input lead sets to accept the outputs from a variety of cartridge tape recorders;
a selector switch cooperative with said input lead sets;
a clipping circuit to clip the input voltage to form a control voltage for said clock;
an amplifier to amplify said control voltage;
a power supply to drive said timer clock and said amplifier; and
a relay switch actuated by the control voltage through said amplifier to start and stop said clock.

No references cited.

LOUIS J. CAPOZI, *Primary Examiner.*

GERALD F. BAKER, *Examiner.*